(12) United States Patent
Ito et al.

(10) Patent No.: US 7,229,596 B2
(45) Date of Patent: *Jun. 12, 2007

(54) EXHAUST EMISSION CONTROL DEVICE

(75) Inventors: Hidetoshi Ito, Yokohama (JP); Kimiyoshi Nishizawa, Yokohama (JP); Ritsuo Sato, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1141 days.

This patent is subject to a terminal disclaimer.

(21) Appl. No.: 09/941,733

(22) Filed: Aug. 30, 2001

(65) Prior Publication Data

US 2002/0025281 A1 Feb. 28, 2002

Related U.S. Application Data

(62) Division of application No. 09/327,484, filed on Jun. 8, 1999, now Pat. No. 6,303,084.

(30) Foreign Application Priority Data

Jun. 17, 1998 (JP) .......................................... 10-170239

(51) Int. Cl.
*B01D 53/94* (2006.01)
*B01D 53/72* (2006.01)
*B01D 53/34* (2006.01)

(52) U.S. Cl. .................. 422/177; 422/171; 422/180
(58) Field of Classification Search ................. 422/171, 422/177, 180, 174; 60/297, 299, 300; 502/439, 502/325, 326

See application file for complete search history.

(56) References Cited

U.S. PATENT DOCUMENTS 5,935,530 A * 8/1999 Langer et al. .............. 422/177
2003/0099583 A1   5/2003 Ikeda et al.

FOREIGN PATENT DOCUMENTS

| DE | 196 17 563 | * | 6/1997 |
| JP | 07-008755 |   | 1/1995 |
| JP | 07-166854 |   | 6/1995 |
| JP | 7-174017 A |   | 7/1995 |
| JP | 09-225265 |   | 9/1997 |
| JP | 9-228828  | * | 9/1997 |
| JP | 09-287438 |   | 11/1997 |
| JP | 2000-002111 |   | 1/2000 |

* cited by examiner

*Primary Examiner*—Hien Tran
(74) *Attorney, Agent, or Firm*—Foley & Lardner LLP

(57) ABSTRACT

The Rh content by percentage in an HC absorbent catalytic converter provided in an exhaust pipe is greater than the Rh content by percentage in an upstream three-way catalyst. In this way, even when HC which has been temporarily absorbed is emitted in an atmosphere and the exhaust gas becomes rich, the HC absorbent catalytic converter displays improved oxidization and removal of HC due to the high content by percentage of Rh which has a high HC conversion ratio in rich atmospheres. There is no necessity to control the air-fuel ratio to a strongly lean ratio and so HC removal can be improved while maintaining suppression of $NO_x$ emissions.

15 Claims, 2 Drawing Sheets

EXHAUST EMISSION CONTROL DEVICE

This application is a divisional application Ser. No. 09/327,484 filed Jun. 8,1999 now U.S. Pat. No. 6,303,084.

FIELD OF THE INVENTION

The present invention relates to an exhaust emission control device for an internal combustion engine.

BACKGROUND OF THE INVENTION

Tokkai Hei 9-228828 published by the Japanese Patent Office in 1997 discloses the reduction of hydrocarbons (hereafter HC) emissions immediately after engine start-up by the provision in the exhaust pipe of an HC absorbent catalytic converter, which is comprised of an HC absorbent material and a three-way catalyst. The HC absorbent material absorbs HC when the catalyst temperature is lower than a fixed temperature and emits HC at temperatures higher than the fixed temperature.

In such a way, HC emitted from the engine is temporarily absorbed by the HC absorbent material in the HC absorbent catalytic converter. When the temperature of exhaust gases in the HC absorbent catalytic converter reaches a fixed temperature, the air-fuel ratio is varied to a lean air-fuel ratio, that is to say, the air-fuel ratio is varied upwardly. This results in a super-oxygenated mixture in the exhaust gases and HC which is emitted from the HC absorbent material is oxidized by the three-way catalyst.

SUMMARY OF THE INVENTION

In this way, it is necessary to control an air-fuel ratio towards a lean air-fuel ratio from a stoichiometric air-fuel ratio and supply sufficient oxygen to react with emitted HC in the exhaust gas in order to improve the reduction of HC emissions. However the more an air-fuel ratio is varied towards a lean air-fuel ratio, the greater the amount of emitted nitrogen oxides ($NO_x$) becomes.

It is therefore an object of the present invention to remove HC while suppressing amounts of emitted $NO_x$ when HC is emitted from an HC absorbent catalytic converter.

In order to achieve the above object, this invention provides an exhaust emission control device for an engine which is provided with an exhaust pipe. The emission control device comprises a first catalytic converter which contains the element Rhodium (Rh), and a second catalytic converter which contains Rh and a hydrocarbon (HC) absorbent material which absorbs HC. The first catalytic converter and the second catalytic converter are provided in series in the exhaust pipe and the Rh content by percentage in the second catalytic converter is higher than the Rh content by percentage in the first catalytic converter.

The details as well as other features and advantages of this invention are set forth in the remainder of the specification and are shown in the accompanying drawings.

DESCRIPTION OF THE PREFERRED EMBODIMENTS

Figure 1:
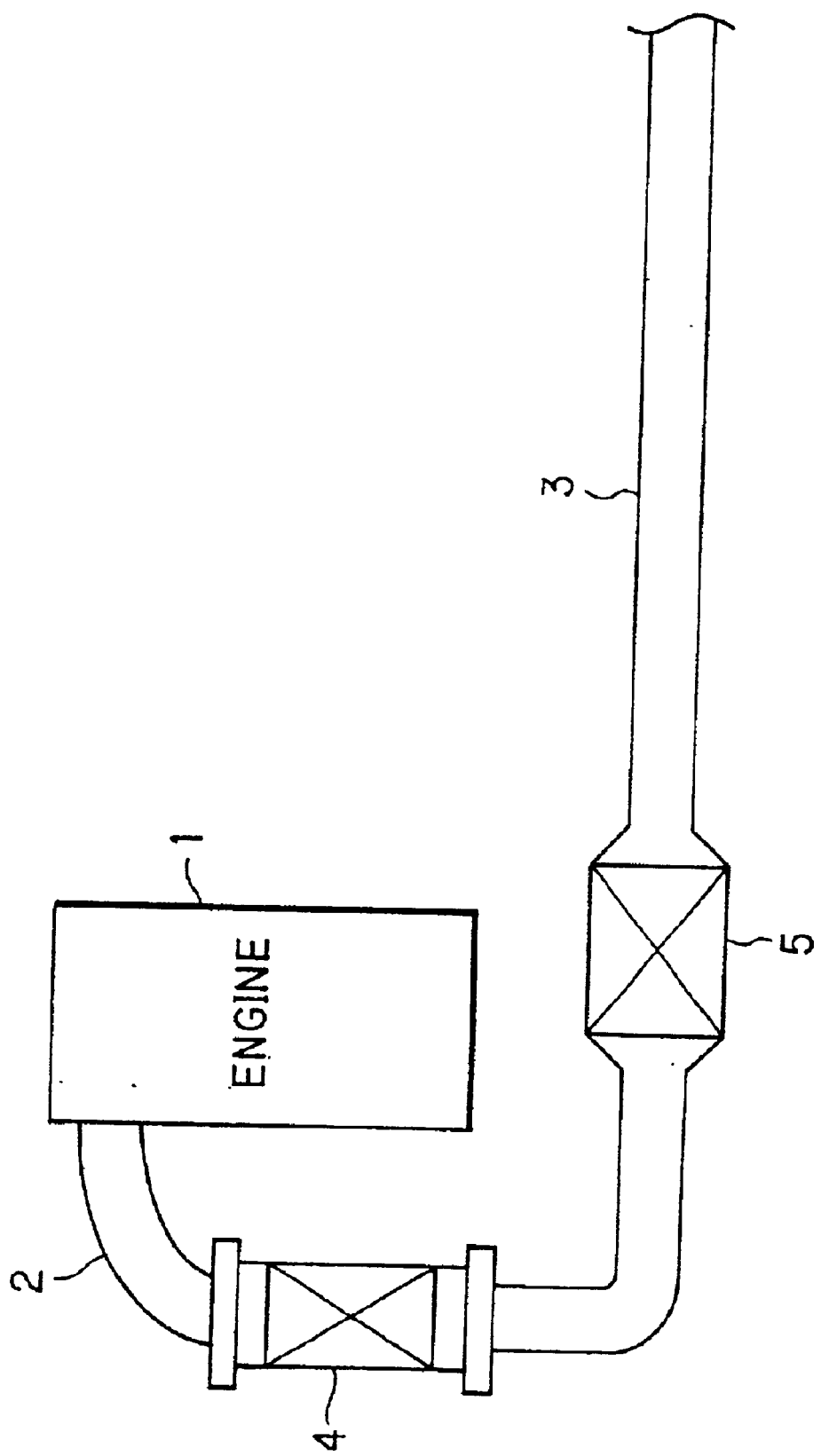
FIG. 1 is a schematic diagram of an exhaust emission control device according to the present invention.

Referring to FIG. 1 of the drawings, an exhaust emission control device for an engine 1 is provided with an exhaust manifold 2, an exhaust pipe 3, a three-way catalytic converter 4 and an HC absorbent catalytic converter 5.

The three-way catalytic converter 4 is provided in proximity to the exhaust manifold 2. The HC absorbent catalytic converter 5 has an HC absorbent material and a three-way catalyst and is provided downstream of the three-way catalytic converter 4.

The precious metal catalysts of the three-way catalytic converter 4 and the HC absorbent catalytic converter 5 comprise combinations of platinum (Pt) and rhodium (Rh), or palladium (Pd) and Rh or a combination of platinum (Pt), Pd and Rh.

The total amount of precious metal catalyst of the three-way catalytic converter 4 is greater than the total amount in the HC absorbent catalytic converter 5. However, the total amount of precious metal catalyst in the three-way catalytic converter 4 may be equal to the total amount in the HC absorbent catalytic converter 5. Otherwise, the total amount of the precious metal catalysts of the HC absorbent catalytic converter 5 may be greater than that of the three-way catalytic converter 4. However, in all cases above, the Rh content by percentage in the HC absorbent catalytic converter 5 is greater than the Rh content by percentage in the three-way catalytic converter 4.

The HC absorbent catalytic converter 5 comprises a coating of HC absorbent material on the upstream half of a honeycomb shaped catalyst carrier and a coating of three-way catalyst on the downstream half of the carrier. Alternatively, the HC absorbent catalytic converter 5 has a coating of HC absorbent material on the surface of the honeycomb shaped catalyst carrier and a coating of a three-way catalyst on the coating of HC absorbent material. Alternatively, a coating comprising a mixture of an HC absorbent material and a three-way catalyst may be provided on a honeycomb shaped catalyst carrier. Zeolite may be used as an HC absorbent material.

If a stoichiometric air-fuel mixture is supplied to the engine 1, the exhaust gas is in a rich atmosphere due to the emitted HC from the HC absorbent catalytic converter 5 when the temperature of the exhaust gas reaches a temperature at which HC temporarily absorbed by the HC absorbent catalytic converter 5 is released. Herein, a rich atmosphere means an atmosphere in which the concentration of HC is high with respect to the amount of oxygen in the exhaust gases. On the other hand, a lean atmosphere means an atmosphere in which the amount of oxygen in the exhaust gases is in surplus.

However in the present embodiment, the Rh content by percentage in the HC absorbent catalytic converter 5 is greater than the Rh content by percentage in the three-way catalytic converter 4. Rh displays a high HC conversion ratio on comparison with other precious metal substrates even when the exhaust gas is in a rich atmosphere. As a result, even in a rich atmosphere resulting from HC emitted from the HC absorbent catalytic converter 5, HC is effectively oxygenated by the HC absorbent catalytic converter 5 and removed from the exhaust gases.

Thus as it is not necessary to control the air-fuel ratio greatly towards a lean air-fuel ratio when HC is being emitted in order to raise the oxygen concentration of the exhaust gas flowing into the HC absorbent catalytic converter 5, $NO_x$ emissions can be also reduced. Furthermore since HC removal by the HC absorbent catalytic converter 5 is improved, it is possible to dispense with the Rh component of the three-way catalytic converter 4.

Since the three-way catalytic converter 4 is provided in proximity to the high temperature exhaust manifold 2, the necessary time for the three-way catalytic converter 4 to reach an activation temperature is shortened which thus heightens the emission control characteristics of the three-way catalytic converter 4.

By using the HC absorbent catalytic converter with a coating of HC absorbent material on the surface of the honeycomb shaped catalyst carrier and a coating of a three-way catalytic on the coating of HC absorbent material, or by using the HC absorbent catalytic converter with a coating of a mixture of an HC absorbent material and a three-way catalyst on the honeycomb shaped catalyst carrier, HC released from the HC absorbent material may be quickly oxygenated and removed by the three-way catalyst which thus heightens the HC emission control characteristics.

If the total amount of the precious metal catalyst in the three-way catalytic converter 4 is made equal to the total amount of the precious metal catalyst in the HC absorbent catalytic converter 5, the same emission control characteristics may be obtained in the HC absorbent catalytic converter 5 as in the three-way catalytic converter 4.

Otherwise, if the total amount of the precious metal catalyst of the three-way catalytic converter 4 is made greater than the total amount of the precious metal catalyst of the HC absorbent catalytic converter 5, the redox reaction performed by the three-way catalytic converter 4 is increased and the heat of reaction is consequently increased. As a result, it is possible to shorten the time for the three-way catalytic converter 4 to reach an activation temperature. Conversely, if the total amount of the precious metal catalyst of the HC absorbent catalytic converter 5 is made greater than total amount of the precious metal catalyst in the three-way catalytic converter 4, the redox reaction performed by the HC absorbent catalytic converter 5 is increased and the heat of reaction is also increased. Although the inflow gases into the HC absorbent catalytic converter 5 in a downstream position have a lower temperature than those inflowing into the three-way catalytic converter 4, it is possible to advance the time for the HC absorbent catalytic converter 5 to reach an activation temperature by employing the heat of reaction.

Figure 2:
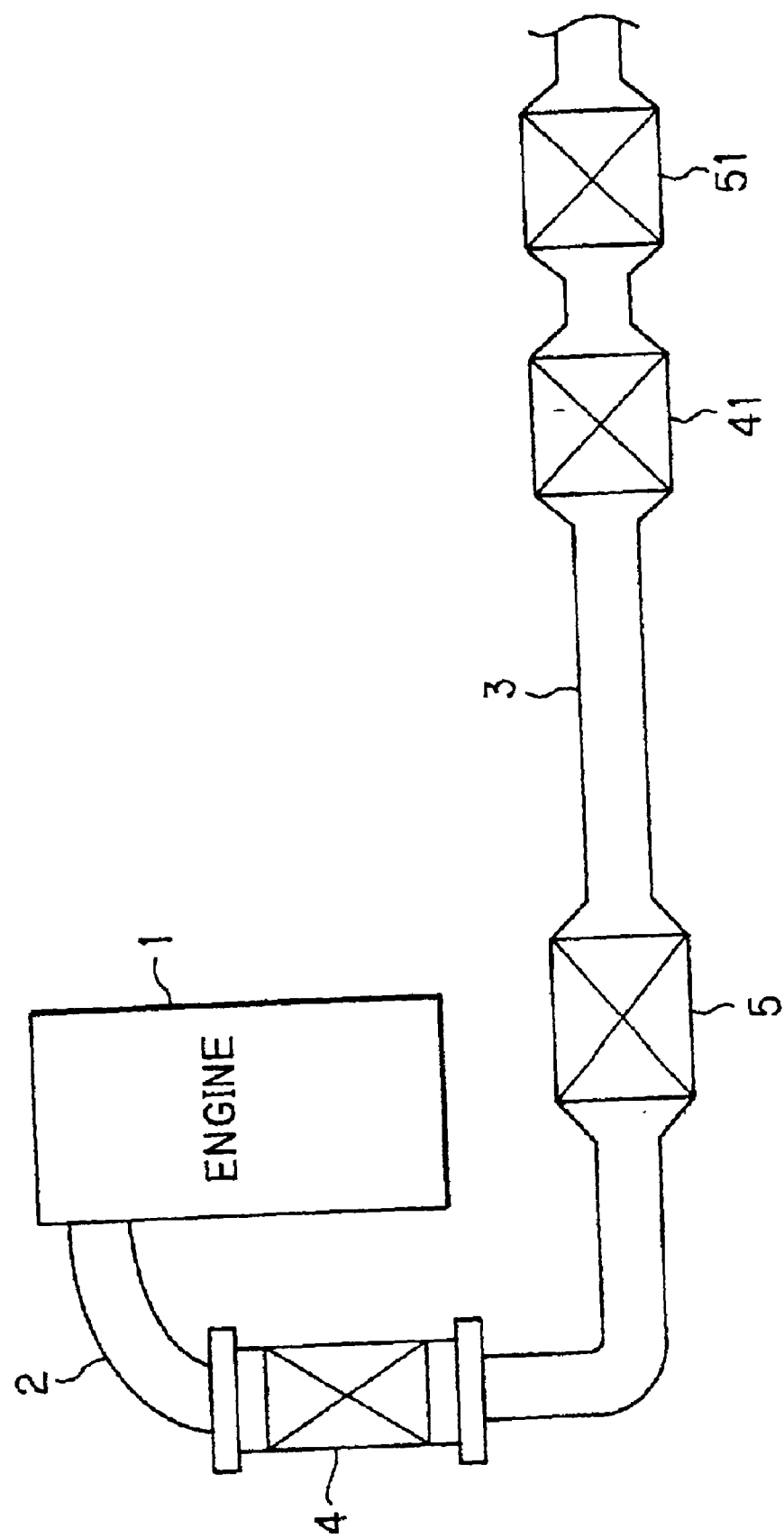
FIG. 2 is similar to FIG. 1, but showing a second embodiment of the present invention.

FIG. 2 shows a second embodiment of the present invention.

The second embodiment differs from the first embodiment in that a second three-way catalytic converter 41 is provided downstream of the HC absorbent catalytic converter 5 and a second HC absorbent catalytic converter 51 is provided further downstream.

If the Rh content by percentage or amount of the three-way catalytic converter 4, the second three-way catalytic converter 41, the HC absorbent catalytic converter 5, and the second HC absorbent catalytic converter 51 are respectively taken to be Crh4, Crh41, Crh5, and Crh51, then $$Crh51 > Crh5 > Crh41 \geq Crh4$$

If the Pt content by percentage or amount of the catalytic converter 4, 41, 5 and 51 is respectively taken to be Cpt4, Cpt41, Cpt5, and Cpt51, then $$Cpt4 > Cpt5 \geq Cpt51 \geq Cpt41$$

A second embodiment of the present invention obtains the same effect as the first embodiment and furthermore achieves the advantage outlined below.

Since the three-way catalyst of the HC absorbent catalytic converter 5 has an oxygen storing function which is similar to that of the three-way catalytic converter 4, when HC absorbent catalytic converter 5, 51 are provided in series, oxygen is stored in the upstream HC absorbent catalytic converter 5 and the amount of oxygen supplied to the downstream HC absorbent catalytic converter 51 is reduced. However in the second embodiment, the Rh content by percentage or amount in the downstream HC absorbent catalytic converter 51 is greater than the Rh content by percentage or amount in the upstream HC absorbent catalytic converter 5. As a result, a high HC conversion ratio is also achieved in the downstream HC absorbent catalytic converter 51.

Furthermore, since the HC absorbent catalytic converter 5, 51 are provided in series, the time required for the respective catalytic converters 5, 51 to reach an activation temperature varies. As a result, it is possible to preserve a difference in the HC emission initiation times between the upstream HC absorbent catalytic converter 5, and the downstream HC absorbent catalytic converter 51. For example, it is possible to regulate the HC emission initiation times of the HC absorbent catalytic converters 5, 51 so that HC is absorbed by the HC absorbent catalytic converter 5 until the three-way catalytic converter 4 reaches an activation temperature and the second HC absorbent catalytic converter 51 absorbs HC until the second three-way catalytic converter 41 reaches an activation temperature.

The content by percentage or amount of Pt which enables a high conversion ratio even in atmospheres where the exhaust gas has a lean air-fuel ratio is higher in the upstream three-way catalytic converter 4 than in the downstream HC absorbent catalytic converters 5, 51. Therefore HC can be oxidized and removed even in atmospheres where the exhaust gas has a rich or a lean air-fuel ratio.

The entire contents of Japanese Patent Application P10-170239 (filed Jun. 17, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed is:

1. An exhaust emission control device for an engine comprising:
    a three-way catalytic converter containing rhodium (Rh), provided in an exhaust passage of the engine; and
    a HC absorbent catalytic converter containing rhodium (Rh) and a HC absorbent material, provided in the exhaust passage downstream of the three-way catalytic converter, wherein a rhodium (Rh) content in the HC absorbent catalytic converter is higher than that in the three-way catalytic converter.

2. An exhaust emission control device as claimed in claim 1, wherein the three-way catalytic converter is provided in proximity to an exhaust manifold of the engine.

3. An exhaust emission control device as claimed in claim 1, further comprising:
    a second HC absorbent catalytic converter provided in the exhaust passage downstream of the HC absorbent catalytic converter, wherein the second HC absorbent catalytic converter contains rhodium (Rh) and a HC absorbent material.

4. An exhaust emission control device as claimed in claim 3, wherein the rhodium (Rh) content in the second HC absorbent catalytic converter is higher than that in the HC absorbent catalytic converter.

5. An exhaust emission control device as claimed in claim 3, wherein the HC absorbent catalytic converter and the second HC absorbent catalytic converter are spaced apart from each other.

6. An exhaust emission control device as claimed in claim 1, wherein the three-way catalytic converter further comprises at least one precious metal selected from platinum (Pt) and palladium (Pd).

7. An exhaust emission control device as claimed in claim 1, wherein the HC absorbent catalytic converter further comprises at least one precious metal selected from platinum (Pt) and palladium (Pd).

8. An exhaust emission control device as claimed in claim 1, wherein the HC absorbent catalytic converter comprises zeolite as the HC absorbent material.

9. An exhaust emission control device as claimed in claim 1, wherein the three-way catalytic converter further comprises platinum (Pt), and wherein platinum (Pt) content in the three-way catalytic converter is higher than that in the HC absorbent catalytic converter.

10. An exhaust emission control device as claimed in claim 3, wherein the three-way catalytic converter further comprises platinum (Pt), and wherein platinum (Pt) content in the three-way catalytic converter is higher than that in the HC absorbent catalytic converter.

11. An exhaust emission control device as claimed in claim 10, wherein platinum (Pt) content in the HC absorbent catalytic converter is higher than that in the second HC absorbent catalytic converter.

12. An exhaust emission control device as claimed in claim 1, wherein the HC absorbent catalytic converter has a coating of the HC absorbent material on a catalyst carrier and a coating of a three-way catalyst on the coating of the HC absorbent material.

13. An exhaust emission control device as claimed in claim 1, wherein the HC absorbent catalytic converter has a coating that comprises a mixture of the HC absorbent material and a three-way catalyst on a catalyst carrier.

14. An exhaust emission control device as claimed in claim 1, wherein the rhodium (Rh) content by amount in the HC absorbent catalytic converter is higher than that in the three-way catalytic converter.

15. An exhaust emission control device as claimed in claim 4, wherein the rhodium (Rh) content by amount in the second HC absorbent catalytic converter is higher than that in the HC absorbent catalytic converter.

* * * * *